Inventor:
Alfred G. F. Kurowski
by O. B. Stickney
Attorney.

Oct. 1, 1929.  A. G. F. KUROWSKI  1,730,040
TYPEWRITING MACHINE
Filed May 24, 1927    3 Sheets-Sheet 2

Inventor:
Alfred G. F. Kurowski,
by O.C. Stickney
Attorney.

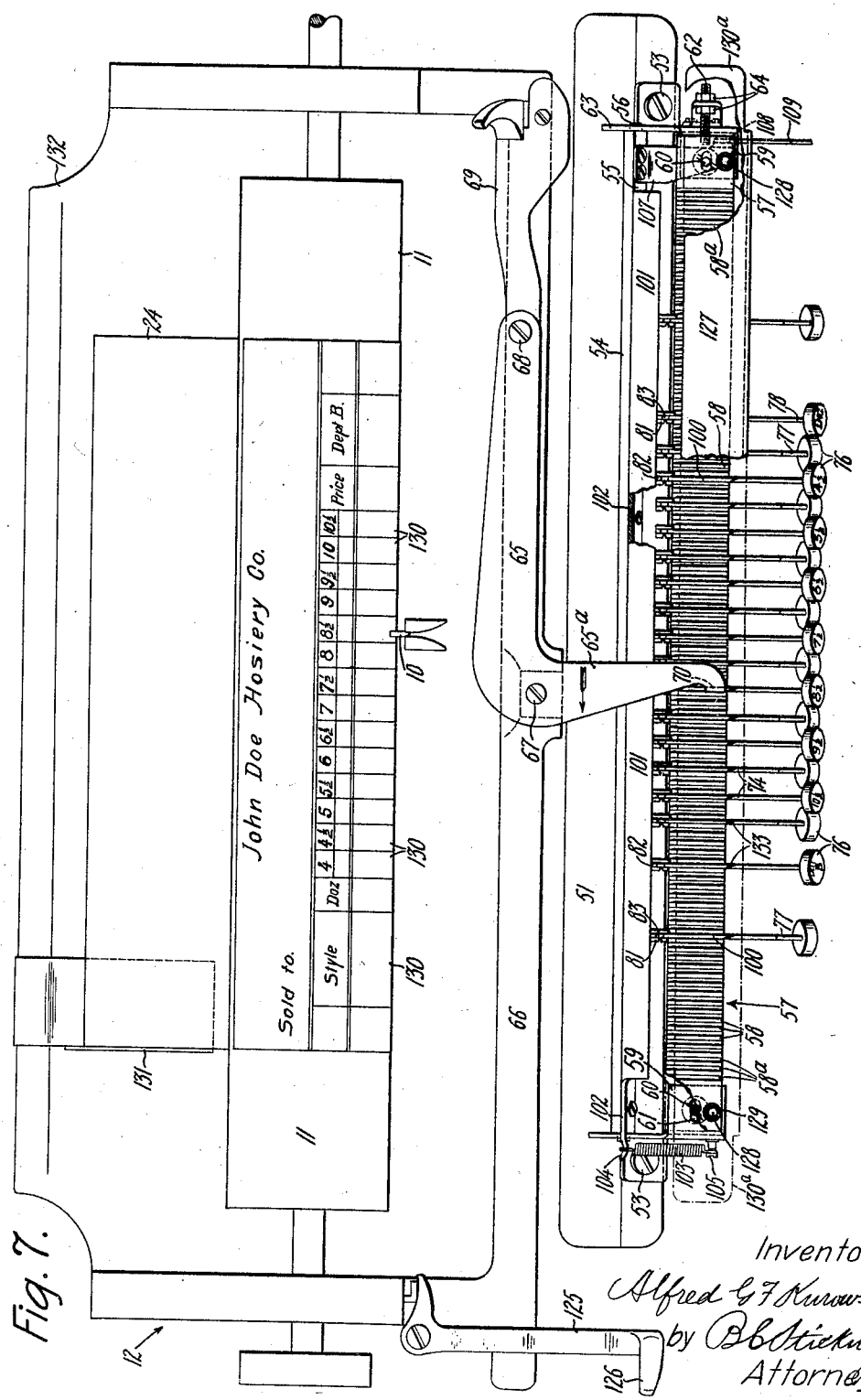

Patented Oct. 1, 1929

1,730,040

UNITED STATES PATENT OFFICE

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE

TYPEWRITING MACHINE

Application filed May 24, 1927. Serial No. 193,863.

This invention relates to tabulating mechanism of the kind known as a "column skipper."

An object of my invention is to provide a column skipper which can be conveniently attached to a standard typewriting machine after it has left the factory.

Another object is to provide a column skipper for controlling a work-sheet having a series of narrow, separately marked columns to bring any desired column to the printing point by one convenient operation of the column skipper.

In carrying out my invention, a rack is detachably mounted on the front of the typewriting machine adjacent the forward end of a forwardly-extending stop on the carriage. Normally ineffective column-stops bearing marked keys are slidably mounted on the rack for movement rearwardly to effective positions for engaging said carriage-stop. A detachably mounted connection is provided between the column-stops and the usual letter-spacing mechanism of the machine, and is arranged for releasing the control of the letter-spacing mechanism over the carriage upon moving a column-stop into the path of said carriage-stop. A spring-pressed member is effective to return each operated column-stop to normal, ineffective position.

A feature of the invention is the provision of a strongly mounted fixed rack on the frame of the typewriting machine straddled by rearwardly movable column-stops effective for engaging a carriage-stop and arresting the carriage.

Another feature is the provision of a universal bar effective for actuating a connection with the usual letter-spacing mechanism to free the carriage from said mechanism upon operation of a column-stop and for returning each of said stops to normal position after operation.

Another feature resides in the construction of the column-stops of the invention with keys which permit a staggered formation of the keys and a close-spacing of the column-stops on the rack.

Other features and advantages will hereinafter appear.

In the accompanying drawings,

Figure 7 is a partial top plan view of an Underwood typewriting machine, having the present invention fastened thereon.

Figure 1:
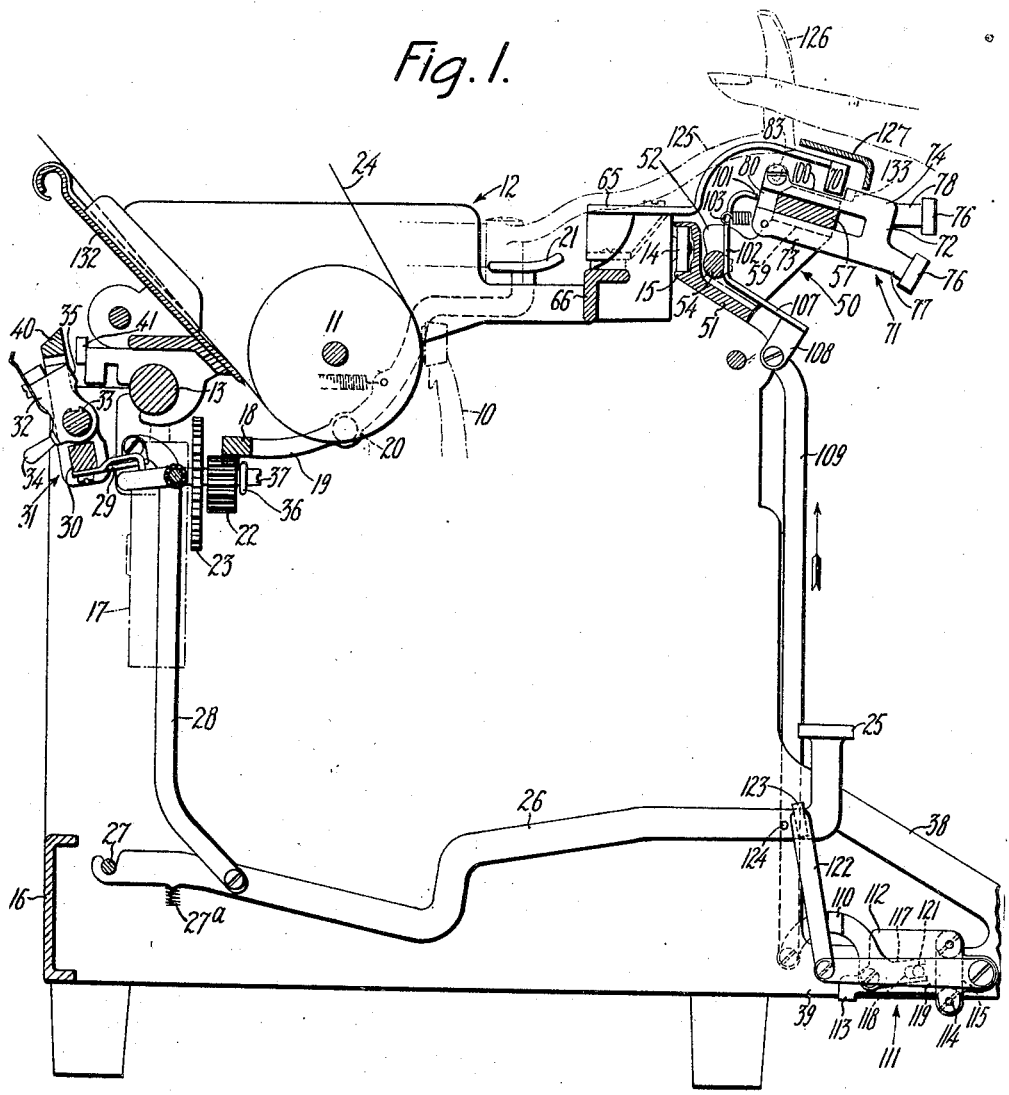
Figure 1 is a fragmentary cross-sectional view, front to rear, of an Underwood typewriting machine having my invention attached thereto.

In the usual Underwood typewriting machine type-bars 10 are swung by mechanism, not shown, against a platen 11 supported on carriage 12 which is mounted for usual lateral movement on a lateral rod 13 and rollers 14, the latter running on a lateral track in a front carriage-rail 15 on the main frame 16 of the machine. The carriage 12 is urged toward the left side by a spring drum 17 and a usual strap, not shown. To provide for letter-spacing the carriage step by step, a rack 18 is displaceably mounted on levers 19, one of which is shown pivoted at 20 on the carriage 12, and has a usual finger-piece 21 on its forward end. The rack 18 normally engages a pinion 22 which is fast to an escapement-wheel 23 controlled by usual escapement-dogs, not shown, said wheel being rotated step by step, counterclockwise.

For quickly moving a point on the typing line of a work-sheet 24 leftwardly to the printing point, there is provided a tabulator-key 25 on a key-lever 26, the latter being pivoted on a fulcrum-rod 27 and returned to normal after operation by a spring 27ª. A link 28 is pivotally fastened adjacent the rear end of the lever 26, from whence it extends upwardly to be pivotally connected to a forwardly-extending arm 29 fast on a lateral bar 30 of a column-stop-carrier-frame 31 pivotally mounted on the main frame 16. A series of usual column-stops 32, one of which is shown, is mounted on a lateral rod 33 for adjustment therealong, the latter being supported in the frame 31. The member 32 may be set by a finger-piece 34 in a forward position to bring its stop 35 into position for engaging the usual counter-stop on the carriage 12, as the latter moves to the left upon depression of the key 25, which causes the disengagement of the rack 18 and pinion 22 by a roller 36 on a pivotally mounted lever 37, which roller is arranged to be swung upwardly to lift the rack upon the forward movement of the frame 31. When the column-skipping mechanism of the present invention is being used, the stops 32 may be swung backwardly and be left in ineffective position, as illustrated in Figure 1, where they will not engage the stop 35 upon swinging the frame 31 forwardly.

The tabulator-key 25 and other character-printing keys, not shown, may compose the usual keyboard of the machine, which is protected at the sides by keyboard-frame elements 38 and 39 of the main frame 16. To prevent too rapid leftward movement of the carriage 12 upon operation of the tabulator-key 25, a brake-bar 40 is mounted on the frame 31 and bears against a leather-faced brake-block 41 on the carriage 12 when the frame 31 is swung forwardly to cause the stops 32 to engage the carriage-stop 35.

The parts described hereinbefore may be the same as those in an Underwood typewriting machine.

A frame, generally designated as 50, is mounted on a lateral flange-member 51 of the front carriage-rail 15 of the main frame 16. The frame 50 includes two end pieces 52 which may be securely fastened on the flange 51 by screws 53 which may also fasten the front rail 15 rigidly to the main frame 16. A rock-shaft 54, having a flat side 55, extends between the end pieces 52 and is journaled therein on bearing portions 56 of reduced diameter. A rack 57, having teeth 58 on its upper and lower sides and grooves or notches 58ª between the teeth, is mounted on lateral bracket-elements 59 of the end pieces 52 by screws 60 which pass through elongated holes 61 in the bracket-elements so as to permit lateral adjustment of said rack. To hold the rack securely against lateral displacement after it has been positioned, a laterally-disposed screw 62 is fastened in the right end of the rack and projects through a hole in a bracket 63 fast on the right-hand end piece 52 (see Figures 3 and 7) for engagement by two lock-nuts 64, one being screwed up tightly against each side of the bracket 63.

For arresting the lateral movement of the carriage 12 a strong L-shaped stop 65 is fastened to a front frame-member 66 of the carriage 12 by screws 67 and 68. The hole for receiving the screw 67 is usually provided for fastening a pointer, not shown. The hole for receiving the screw 68 is usually provided for fastening a usual finger-guide 69. The stop 65 includes an integral member 65ª, which extends forwardly over the rack 57 and carries an integral depending lug 70 whose lower end extends downwardly to within a short distance of the upper edge of the teeth 58 and adjacent their forward ends.

Figure 2:
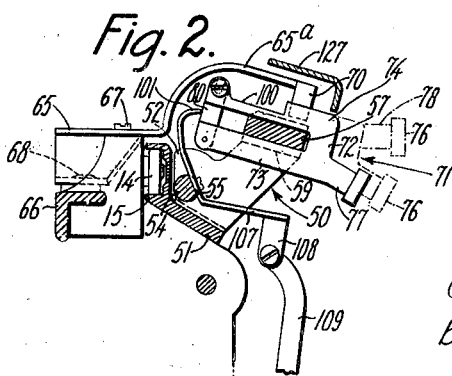
Figure 2 is a part-sectional view of the mechanism shown in Figure 1, the column-stop being shown in operated carriage-arresting position.

In arresting the leftward travel of the carriage at a desired point, the carriage-stop 65 co-operates with one of a series of column-stops 71 mounted on the rack 57. The rack, as shown in Figure 2, has a rectangular cross-section, and is fastened on the brackets 59 with the longer side of its cross-section inclined slightly upwardly at the rear, which positioning is effective to safeguard the column-stops against being jarred forward into the path of the lug 70.

As disclosed herein, each of the stops 71 includes a substantially U-shaped body 72, which has a fork-like arm member 73 to be disposed in a notch 58ª between two teeth 58 on the lower side of the rack 57, and a fork-like arm-member 74 to be disposed in a superjacent notch between two teeth 58 in the upper side of the rack. Each column-stop 71 is provided with a key 76, which may bear a suitable individual mark or character to distinguish it from the other keys.

Figure 6:
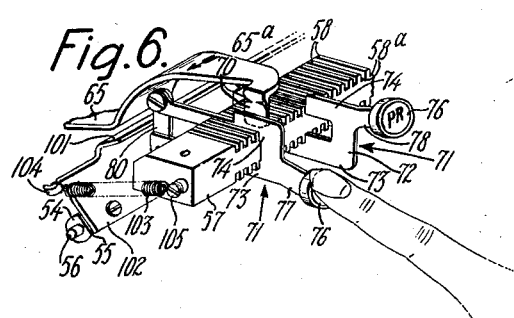
Figure 6 is a fragmentary perspective view, showing the left end of the column-stop rack and certain parts associated therewith, the column-stop being shown in operated position on said rack.

The notches 58ª between the teeth 58 are positioned a letter-space distance apart in the rack 57. It is desirable to have the keys 76 large enough in diameter for convenient engagement by an operator's finger and yet not interfere with the operation of adjacent keys on either side. To secure this advantage and also permit two column-stops 71 to be positioned closely together for controlling movements of the carriage 12 to bring adjacent narrow columns of a work-sheet to the printing point in one operation, some of the column-stops 71 may carry their keys mounted on arms 77, each of which is integral with its body 72 and extends forwardly from the lower part of the latter and its inclined downwardly a small amount for reasons presently to appear. The remainder of the stops 71 may carry their keys on arms 78 similar to arms 77, except each arm 78 extends forwardly from the upper part of its body 72 and is inclined upwardly a small amount. By alternating the two above-described kinds of key-carrying arms, as illustrated in Figures 1 and 6, a series of column-stops may be closely spaced on the rack 57 to be effective for controlling the typing on a work-sheet having a continuous series of narrow columns.

Figure 4:
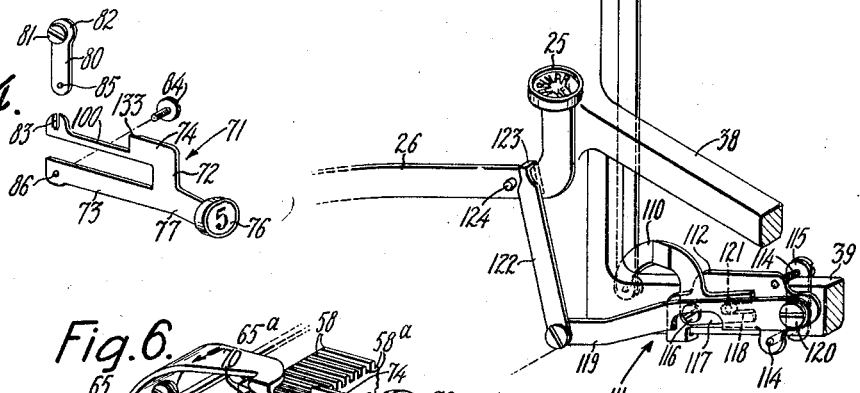
Figure 4 is a spread perspective view of the parts constituting a column-stop employed in my invention, the parts being separated to better illustrate their construction.

The rear ends of the arms 73 and 74 may be connected by a strap 80 fastened thereto in the rear of the rack 57 after the column-stop 71 is straddled thereon. The strap 80 may take the form shown in Figure 4 and be fastened by screwing a shouldered screw 81 in an upper enlarged end 82 for engagement in an open slot 83 in the upper side of an arm 74 at its rear end, and by having a screw 84 pass through a hole 85 in the lower end of the strap 80 and engage a threaded hole 86 in the rear end of the lower arm 73. To remove a column-stop 71 from the rack 57 it is only necessary to remove the screw 84 and lift the strap 80 upwardly and pull the body 72 forward.

Figure 5:
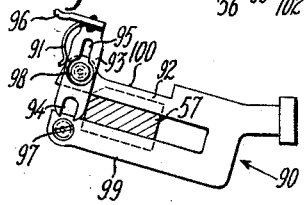
Figure 5 is a side view of a different form of column-stop which may be employed in my invention, the parts being shown partly separated to better illustrate their construction.

In some cases, it may be desirable to remove column-stops quickly in the present device without first taking out any screws. To this end, a column-stop 90 (see Figure 5) may replace the column-stop 71, of which it may be a duplicate, except as follows: The slot 83 in the end of arm 74 is replaced by a threaded hole in an upper arm 92 of the column-stop 90. The strap 80 is replaced by a strap 93, which has an open lengthwise slot 94 in its lower end, a key-hole slot 95 in its upper end, and a finger-piece 96 on its upper end for being grasped by an operative. For holding the strap 93 on the column-stop 90, shoulder-screws 97 and 98 may engage in the slots 94 and 95, respectively, after being screwed in a lower arm 99 and the upper arm 92 in the usual way. Also, a detent-spring 91 may be mounted to snap over the rear end of arm 92. It can be readily seen that the strap 93 may be removed in the usual way without removing either of the screws 97 or 98.

The top edge of the upper arm 74 (see Figures 1 and 5) extends past the lower end of the lug 70, and, in order to permit normal lateral movement of the carriage 12, a section is cut out of the top of each upper arm 74 adjacent the rear end of the latter at 100. The arms 73 and 74 are longer than the width of the rack 57 and all of the column-stops 71 are normally urged forwardly by means to be presently described until the strap 80 stops against the rear side of the rack. In this position of the column-stops, the forward end of the cut-out section at 100 of the arm 74 is disposed a short distance forward from the front of the lug 70. To move the forward portion of the arm 74 rearwardly into position for engaging the lug 70 and arresting the lateral movement of the carriage 12, it is only necessary to press lightly against the key 76.

The operative movement of a column-stop swings rearwardly an upper forwardly-bent portion 101 on a laterally-disposed universal bar 102, which engages against all of the straps and which is fastened at its lower edge to the flat side 55 of the shaft 54, thereby rocking the latter counter-clockwise against the pull of a contractile spring 103, which has one end fastened to an ear 104 on the left end of the universal bar, and the other end to a screw 105 on the left end of the rack 57. Rearward movement of any column-stop will thus be effective to rock the shaft 54, to whose right end is fastened a forwardly-extending arm 107 having a depending lug 108. A link 109 has its upper end pivotally fastened to the lug 108, and its lower end pivotally fastened to the rear end of a lever 110, which forms an element of a lever-system, generally designated as 111, and which is effective to operatively connect the link 109 to the tabulator-key-lever 26. The lever-system 111 is mounted against the inner side of the lower element 39 of the keyboard-frame on a support 112, which has a lug 113 engaging under the frame-element 39. Screws 114 pass through apertures in the upper and lower ends of a strap 115 disposed against the outside surface of the frame-element 39, and are screwed into suitably positioned threaded holes in the support 112 for holding the latter tightly against the frame-element. The lever 110 extends forward from the link 109 and is pivoted about a shoulder-screw 116 in the support 112, and has an arm 117 extending forwardly from the screw 116, and arranged with a lengthwise open slot 118. The link 109 is disposed on the outside of the frame-elements 38 and 39 to be kept clear of the keyboard elements of the machine, and the lever 110, which has its fulcrum on the inside of the element 39, is arranged with a curve or bend formed in its rear portion, convex side up, and turned outwardly, for passing over the top of the element 39 to a connection with the link 109. Since the operative movement of the link 109 is upward, the curved portion of the lever 110 may, in normal position, be compactly disposed adjacent the top surface of the frame-element 39. A lever 119 is pivoted about a screw 120 in the forward end of the support 112 and extends rearwardly therefrom adjacent and parallel to the slotted arm 117, and thence leftwardly to a point substantially below the tabulator-key 25. A pin 121 fast in the lever 119 engages in the slot 118. A pull-link 122 has its lower end pivotally fastened to the rear end of the lever 119, and has its upper end formed with a U-shaped downwardly-open hook 123, which engages over the top of the key-lever 26 and permits the latter to be depressed without affecting the lever 119 or other column-skipping mechanism of the invention. The key-lever 26 carries a lateral pin 124, against which the rear edge of the link 122 engages to be supported against falling rearwardly. When the key-lever 26 is depressed by pressure on the key 25, the pin 124 slides idly along the rear edge of the link 122, but remains effective to support the latter in an upright, operative position.

The operation of a column-stop is effective by the above-described operative connection to depress tabulator-key-lever 26 and free the carriage 12 from control of the usual letter-spacing mechanism. Each column-stop 71 is automatically returned to normal ineffective position by the universal bar 102 upon being released. The above-described connection between an operated column-stop 71 and the usual tabulator-key 25 is effective to permit the usual spring to cause the rack 18 and pinion 22 to become engaged again, upon release of said operated column-stop. This advantageous arrangement permits the usual tabulating mechanism of the typewriting machine to be used without interference from the column-skipping mechanism of the present invention.

The arms 73 and 74 of the column-stop 71 are arranged to move in their respective notches 58ª with an easy sliding fit. As illustrated in Figure 2, the key-carrying arm 77 of the column-stop 71 is inclined slightly downward from the direction of the arm 73 to give an easier sliding action of the arms 73 and 74 on each side of the rack 57, i. e., substantially such a sliding action as would result from positioning the arm 77 between the arms 73 and 74 and disposing it parallel thereto. For a like reason the arms 78 which are positioned at the upper side of the column-stop opposite the upper arm 74 will have a slight upward inclination. The above-noted angular construction of the key-carrying arms also provides more room for the staggered keys 76.

It is usually desirable to remove the usual letter-space lever of the typewriting machine of the present disclosure and replace it by a line-space lever 125, which has a finger-piece 126 disposed high enough for an operative's finger to engage the same and move conveniently along over a guard-plate 127 fastened to the rack 57 by screws 128 passing through spacing collars 129, which are effective to support the guard-plate above the lug 70. The guard-plate 127 may have downwardly-inclined ends 130ª, which overhang the ends of the rack for deflecting the operative's hand thereover and upward along the top of the guard-plate.

In one use of my column-skipper mechanism, the work-sheet 24 may be a bill-sheet or form and bear a series of narrow printed columns 130, each having a separate identifying mark. The sheet 24 may be laterally gaged on the platen 11 by a usual side gage 131 adjustably mounted on a usual rear paper-table 132. The left edge of a column 130 is brought substantially to the printing point, indicated by the type-bars 10, and the lug 70 is moved at the same time to a corresponding position along the rack 57, the work-face of the lug normally stopping even with the left edge of a notch 58ª. A column-stop 71, bearing the same kind of distinguishing mark as the column 130 then disposed at the printing point, is placed on the rack in the notch which registers with the lug 70. Other column-stops 71 are placed in like manner in notches 58ª, which correspond with the columns on the sheet 24, each column-stop being marked like its corresponding column. Since each sheet 24 of a series or group has a like arrangement of its columns 130, and all sheets are positioned against the gage 131, only one setting or adjustment of the column-stops 71 along the rack for a group of like work-sheet is required. It will be noted that a column-stop 71, if desired, can be set to stop the center or right side of the column at the printing point.

Figure 3:
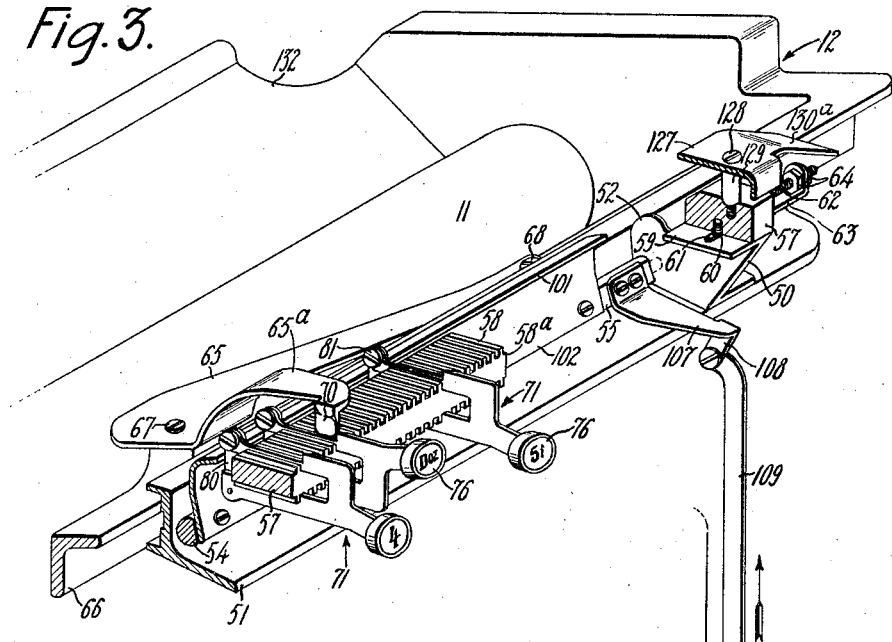
Figure 3 is a front fragmentary perspective view of the parts shown in Figure 1.

When the leftward travel of the carriage 12 is arrested by engagement of the lug 70 against the stop 71, the carriage is still under the pull of the spring 17, and the rack 18 and pinion 22 are not yet in engagement to hold the carriage 12 stationary against the pull of the spring. The column-stop 71, upon being released, is disengaged very rapidly from the lug 70 by the spring-pulled bar 102. Upon release of a column-stop 71, the usual escapement mechanism of the machine arrests the movement of the carriage 12. To decrease the shock of this arresting action, the rear vertical end of the lug-engaging portion of the column-stop arm 74 is tapered off to the left, as shown at 133 in Figures 4 and 7. Also, the wide face of the lower end of the lug 70 may be arranged with a slight convex curve, as indicated in Figure 3, for cooperation with the tapered portion of the arm 74.

As can be readily seen by those skilled in the art, my column-skipping mechanism can be modified in certain ways for attachment to other typewriting machines than that shown in the present disclosure without departing from the scope of my invention.

Variations may be resorted to within the scope of the invention, and portions of the improvements may be used without others.

Having thus described my invention, I claim:

1. In a typewriting machine, the combination with a platen-carriage and a letter-feeding mechanism therefor, of a tabulating mechanism including a counter-stop on said carriage, a rack on said machine, a series of column-stops, each stop slidably mounted on said rack for column-selecting movement rearwardly across the path of said forwardly-extending stop, said stops being relatively adjustable along said rack, and means for releasing said carriage from control of said letter-feeding mechanism upon separate movement of each of said column-stops at any location to which it is adjusted.

2. In a typewriting machine, the combination with a platen-carriage, a letter-feeding mechanism therefor, a counter-stop on said carriage, and a main frame having a rack of a series of column-stops slidably mounted on said rack for movement across the path of said carriage-stop, said stops being relatively adjustable along said rack, and means operatively connecting each of said column-stops with said letter-feeding mechanism at any location to which the stop is adjusted, to release said carriage immediately after the column-stop has moved into the path of said carriage-stop.

3. In a device of the class described, in combination, a rack having teeth a letter-space distance apart, a plurality of movable column-stops movable upon said rack between said teeth and provided at their ends with keys wider than the pitch of said teeth, said stops being relatively adjustable along said rack, said keys mounted for engagement by an operative's finger to move said stops to effective carriage-stopping positions, bearing members for said keys permitting said stops to be adjusted along said rack to locations in close proximity to each other to be operated without interference of said keys, one with another, said key-bearing members extending alternately from the tops and bottoms of said stops in staggered formation, and carriage-releasing mechanism operable concomitantly with any selected key.

4. In a device of the class described, in combination, a rack having series of upper and lower teeth, each series disposed a letter-space distance apart, a plurality of rearwardly-movable column-stops straddling said rack between said teeth and provided at their forward ends with keys wider than said teeth, said keys to be engaged by an operative's finger to move said stops rearwardly to effective carriage-stopping positions, and means effective to permit said stops to be positioned in close proximity to each other and to be operated without binding or pinching on said rack, said means including upwardly inclined key-bearing members projecting forwardly from the upper side of one-half of said stops, and downwardly inclined key-bearing members projecting forwardly from the lower side of the remaining half of said stops, said upper and lower key-bearing members being alternately positioned on said rack in a staggered formation.

5. In a typewriting machine, the combination with a platen-carriage, a letter-spacing mechanism, and a counter-stop on said carriage, of a series of column-stops normally disposed in ineffective positions, said column-stops being individually adjustable to different column-positions, each column-stop being also separately movable rearwardly into the path of said carriage-stop, a yielding instrumentality engaged by each column-stop upon operation of the latter and made effective for returning each column-stop after operation to its normal ineffective position, and a connection between said instrumentality and said letter-spacing mechanism effective for disengaging the latter from said carriage upon movement of said instrumentality by operation of a column-stop.

6. In a typewriting machine, the combination with a platen-carriage, a letter-spacing mechanism, a tabular key-lever, and a forwardly-extending stop on said carriage, of a series of column-stops normally disposed in ineffective positions forwardly from said carriage-stop, each column-stop being movable rearwardly into the path of said carriage-stop without affecting the remaining column-stops, a yielding instrumentality engaged by each column-stop upon operation of the latter and made effective thereby for returning the operated column-stop to its normal ineffective position, and a connection between said instrumentality and said tabular lever effective for depressing the latter to disengage said letter-spacing mechanism from said carriage upon movement of said instrumentality by operation of a column-stop, said connection permitting operative movement of said tabular lever without affecting said instrumentality and said column-stops.

7. In a tabulating mechanism for a typewriting machine having a carriage, the combination with a stop on said carriage, of a rack on said machine, said rack having upper and lower teeth, and a series of column-stops normally disposed on said rack in ineffective positions for engaging said carriage-stop, each of said column-stops having an upper and a lower element slidably engaging the rack-teeth, said upper and lower elements being connected at each end beyond said teeth and supporting said stop against the impact of said carriage-stop.

8. In a device of the class described, a carriage, a stop on said carriage, a series of column-stops movable rearwardly across the path of said carriage-stop for arresting the movement of the latter, and means for normally holding said column-stops out of engagement with said carriage-stop, said means including a spring-pressed universal bar engaging against the rear of all of said column-stops, and a rack supporting said column-stops and inclined downwardly toward the front.

9. A tabular-stop for a typewriter-tabulating mechanism, including an upper and a lower forked-arm element integrally joined at one end, a detachable strap for connecting the free ends of said arm-elements to hold said stop on a rack of said mechanism, and an indicia-bearing key fastened to said stop forwardly from the integrally-joined ends of said arm-elements, a portion of said upper arm-element extending above the remaining portion thereof for carriage-arresting engagement with a laterally-movable element of the typewriter.

10. In a typewriting machine, the combination with a leftwardly-urged platen-carriage and a letter-spacing mechanism, of a column-skipping tabulating mechanism including a fixed rack on said machine, a stop-member on said carriage extending forwardly adjacent said rack, a depending lug on said stop-member transversely disposed relatively to said rack, and a column-stop on said rack having an upwardly-extending portion normally positioned out of the path of said lug and movable rearwardly into position for engaging said lug to arrest the travel of said carriage at a short distance to the right from a desired travel-terminating point of said carriage, means for releasing said carriage from control of said letter-spacing mechanism upon operative movement of said column-stop, means for automatically returning said column-stop to normal position upon releasing the same after operative movement thereof, and instrumentalities effective during the final returning movement of said column-stop to control said carriage that it may complete its travel to said desired travel-terminating point in a gradual manner, said instrumentalities including a leftwardly-tapered rear end on said upwardly-extending lug-engaging portion of said column-stop, and a convex work-face on the lower column-stop-engaging end of said lug.

11. In a typewriting machine, the combination with a platen-carriage, letter-spacing mechanism, a tabular key-lever, and a forwardly-extending stop on said carriage, of a rack fixed on said machine, a series of column-stops straddling said rack in ineffective positions forwardly from said carriage-stop, each column-stop being movable rearwardly into the path of said carriage-stop without affecting the movement of the remaining column-stops, a yielding instrumentality engaged by each column-stop upon operation of the latter and made effective thereby for returning the operated column-stop to its normal effective position, and a connection between said instrumentality and said tabular key-lever effective for operating the latter to disengage said letter-spacing mechanism from said carriage upon operative movement of the column-stop, and for releasing said key-lever upon return of the operated column-stop to normal position.

12. In a tabulating mechanism for a typewriting machine, a rack, a carriage and counter stop movable along said rack, column-stops straddling said rack between the teeth thereof, and adjustable individually along said rack, said column-stops being separately movable rearwardly into the path of said carriage-stop, means for operating said column-stops selectively, and means for returning said column-stops to ineffective positions at all locations to which they may be adjusted along said rack.

13. In a tabulating mechanism for a typewriting machine, a rack fixed on the front of said machine, a carriage-stop on said machine movable laterally along the path adjacent said rack, column-stops straddling said rack between the teeth thereof, said column-stops being adjustable separately along said rack and also being separately movable rearwardly into the path of said carriage-stop, and means for returning said column-stops after operation to ineffective positions forwardly from said carriage-stop, said means including a spring-urged universal bar engaging against the rear of said column-stops.

14. In a device of the class described, a carriage, a stop on said carriage, a rack, a series of laterally-fixed column-stops movable rearwardly across the path of said carriage-stop for arresting the movement of the latter, said column-stops being individually adjustable along said rack, and means for normally holding said column-stops out of engagement with said carriage-stop, including a universal bar arranged for normally pressing said column-stops forwardly.

15. In a column-stop for a tabulating mechanism provided with a rack, an upper and a lower arm straddling said rack, an integral connection for said arms at the front of said rack, and a detachable connection for said arms at the rear of said rack, said arms being longer than the front-to-rear width of said rack to permit operative movement of said stop transversely to said rack, said detachable connection including shoulder-screws in the rear end of said arms, a strap having slots engaging about the shoulders of said screws, a finger-piece on said strap to be gripped by an operative's finger, and a spring-detent for holding said strap on said screws.

16. In a device of the class described, the combination with a rack having upper and lower teeth, and a series of closely spaced column-stops having upper and lower parallel arms straddling said rack between said teeth for operative movement transversely to said rack and mechanism for returning said keys, after operation, to starting position effective for directing a returning force between the upper and lower arm of each of said column-stops, of means for mounting operating keys on said stops in staggered relation effective for moving said stops rearwardly without appreciably binding or pinching said rack, said means including upwardly inclined key-carrying arms extending forwardly from the upper arms of one-half of said column-stops, and downwardly inclined key-carrying arms extending forwardly from the lower arms of one-half of said column-stops, the inclination of said key-carrying arms being such that the lines of force from an operative's fingers pushing on said keys will be directed between said upper and lower arms and substantially parallel thereto.

17. In a typewriting machine, the combination with a main frame, a keyboard-frame, a tabular key-lever and a carriage, of a column-skipper including a rack in front of said carriage, a forwardly projecting stop on said carriage, a series of column-stops on said rack movable rearwardly for arresting leftward movement of said carriage-stop, a rock-shaft, a universal bar operatively engaging said column-stops and being mounted on said rock-shaft for rocking the latter upon operation of any of said stops, a lever-system, means for clamping said system as a unit to said keyboard-frame, an operative connection between said lever-system and said tabular key-lever for depressing the latter upon operation of said lever-system, and an operative connection between said rock-shaft and said lever-system effective to operate the latter when said shaft is rocked by operation of one of said column-stops.

18. In a typewriting machine having a main frame and a carriage, the combination with a skeletonized keyboard-frame having an upper and a lower side frame rib, a tabular key-lever and column-skipping mechanism mounted on said main frame at the front thereof for controlling the lateral movement of said carriage, of a lever-system clamped against the inner face of said lower rib and effective upon operation for depressing said tabular key-lever, and means for operatively connecting said lever-system and said column-skipping mechanism, including a rearwardly extending arm of a laterally-pivoted lever-element of said lever-system, and an upwardly extending link outside said keyboard-frame, said arm having a rightwardly-bent, convexly-curved portion for passing over said lower rib adjacent thereto in a compact manner to be connected with the lower end of said link, the upper end of said link being operatively connected to said column-skipping mechanism which is effective to raise said link at each operation thereof and operate said lever-system.

19. In a column-skipper for a typewriting machine, a rack fixed at the front of said machine, a series of U-shaped column-stops, each having an upper and lower arm straddling said rack and being longer than the front-to-rear width of said rack, a strap detachably connecting the rear ends of said arms to permit easy removal of each column-stop from said rack for lateral positioning therealong, a laterally-disposed universal plate or bar pivoted below said rack and having a forwardly-bent upper edge, and a spring fastened to said universal bar and to said rack for swinging said upper edge against the rear of said straps to normally hold the latter against the rear of said rack, in which position said column-stops are ineffective, the arrangement of said spring and said universal bar being effective to permit rearward movement of each of said column-stops to an effective position, and to return each operated column-stop to its normal ineffective position automatically.

20. In a tabulating mechanism for a typewriting machine, a rack fixed at the front of said machine, a series of rearwardly-movable U-shaped column-stops straddling said rack, and a single bar arranged for normally holding all of said stops in a forwardly-disposed, ineffective position, and for being swung rearwardly, upon operation of one of said column-stops, out of engagement with the remaining unoperated column-stops, said unoperated stops while not engaged by said bar being safeguarded against accidental displacement from their ineffective positions by inclining said rack downwardly toward the front.

ALFRED G. F. KUROWSKI.